Figure 1:
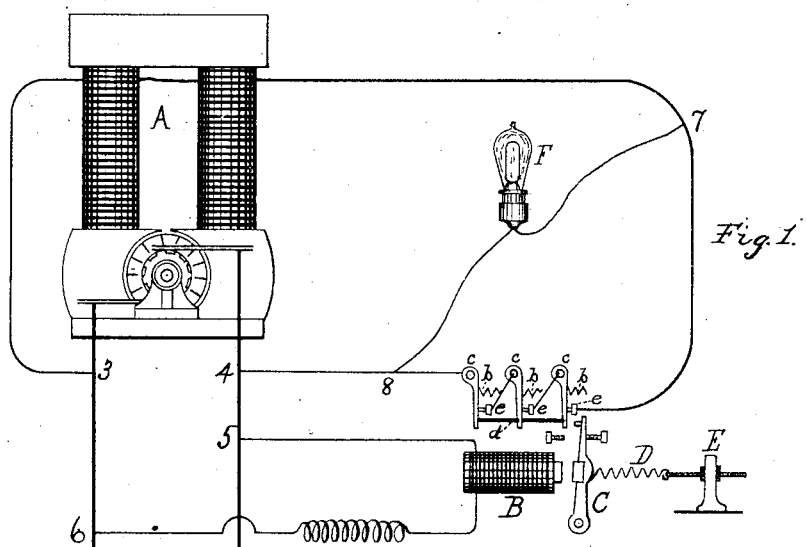

(No Model.)

T. A. EDISON.
REGULATOR FOR DYNAMO ELECTRIC MACHINES.

No. 265,781. Patented Oct. 10, 1882.

WITNESSES:
E. C. Rowland
H. W. Seely

INVENTOR:
T. A. Edison
BY Rich'd N. Dyer
ATTORNEY.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 265,781, dated October 10, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in the Regulation of Dynamo or Magneto Electric Machines, (Case No. 405;) and I do hereby declare that the following is a full and exact description of the same, reference being had to the accompanying drawings, and to the letters of reference marked thereon.

The object of my invention is to produce a new method of and means for regulating the generation of current by a dynamo or magneto electric machine supplying current to a multiple-arc system of electrical distribution, which shall operate automatically upon the addition or removal of translating devices in the system, and shall not act to vary the resistance of or the current flowing through the field-of-force circuit of the machine.

My invention consists, first, in employing a vibrating circuit-controller operated by the current generated, the vibrations of which produce vibrations or rapid and successive openings and closings of the circuit energizing the field-magnet, such vibrations properly regulating the energy of the field-magnet, and therefore the generation of current by the machine, the length and duration of the vibrations being controlled by the number of translating devices in circuit, and also by variations in the speed of the engine which drives the generator; and, second, in various devices and combinations of devices for accomplishing this result, as will be more fully set forth. This may be accomplished by placing an electro-magnet in a multiple-arc circuit from the main conductors and in the field-circuit a vibrating circuit-controller, which should be one so constructed as to make and break contact at a number of points simultaneously, so that the spark due to such breaking will be reduced. This circuit-controller is preferably operated by the backward and forward movement of the pivoted spring-armature of the electro-magnet. It will be seen that when the field-circuit is closed at this point, as its resistance is low, much too large a current will pass through it; but when the circuit is open no current at all will pass. Thus a constant and rapid vibration of the circuit-controller will cause the proper energization of the field-magnet. Such vibrations are kept up automatically and continuously, whether many translating devices or none at all are in circuit; but differences in the number of translating devices in circuit, and also variations in the speed of the engine by varying the energy of the electro-magnet, vary also the relative durations of the openings and closings of the field-circuit according to the requirements of the system. If desired, in order to still farther reduce the spark, and to produce a constant current for primarily energizing the field-magnet, a shunt may be made from the field-circuit around the circuit-breaker containing a high resistance, one of my incandescing electric lamps being preferably placed therein for this purpose; or such shunt may include a portion of the field-magnet coils. These arrangements are of course equivalent to entirely breaking the circuit. The armature-lever may be so arranged that the tension of its spring is adjustable, so that the relative durations of make and break, and consequently the current generated, and the candle-power of the lamps in the main circuit, may be regulated. This may be better understood by reference to the drawings, in which—

Figure 2:
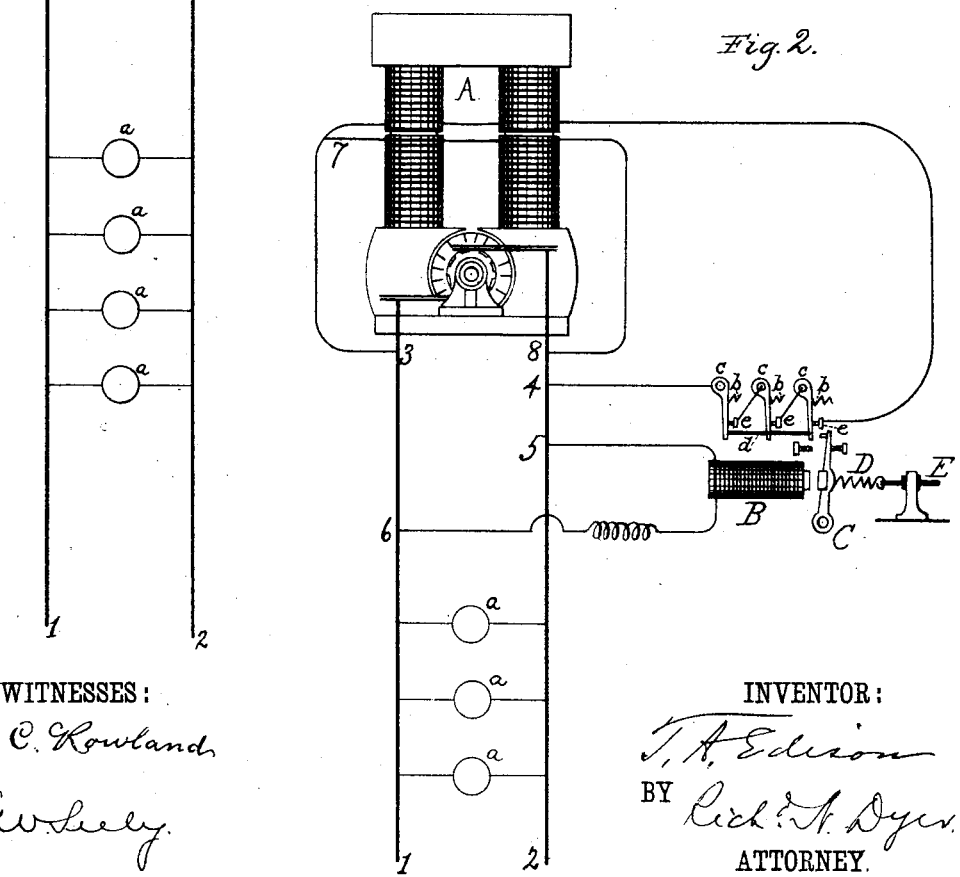

Figure 1 is a diagram showing the form of my invention, in which a lamp is placed in the shunt around the circuit-controller; and Fig. 2 shows the form in which the shunt includes a portion of the field-magnet coils.

A is a dynamo-electric machine, from which lead main conductors 1 2, containing translating devices *a a*, placed in multiple arc.

3 4 is the circuit energizing the field-magnet of the generator. This circuit contains a vibrating circuit-controller which makes and breaks contact at a number of points simultaneously. It is composed of a number of pivoted arms, *c c c*, each provided with a spring, *b*, and connected together by an insulating-pin, *d*. A corresponding number of contact-points, *e e e*, are used, connected as shown, so that when all the arms swing forward simultaneously the circuit is broken between each arm and its contact-point.

In a multiple-arc circuit, 5 6, is placed an electro-magnet, B, provided with a pivoted armature, C, retracted by a spring, D. An adjusting device, E, is used to regulate the tension of the spring, so as to control the length of the vibrations of the armature.

Referring to Fig. 1, in a shunt-circuit, 7 8, around the circuit-breaker is placed an incandescing electric lamp, F, of high resistance. This may, however, be dispensed with altogether; or instead of the lamp any sufficiently-high resistance may be used. The armature C is so placed that when drawn forward by the magnet B it throws the circuit-breaking arms c back from their contacts, and when the armature is retracted the spring contact-arms follow it and again complete the circuit. It is evident that these vibrations will be continuous so long as the generator is in operation, whether lamps are in circuit or not.

In Fig. 2 the shunt 7 8 includes a portion of the coils of the field-magnet.

The operation of these devices is as hereinbefore explained.

It is evident that any other suitable form of vibrating circuit-breaker might be used, though it should preferably be one which breaks the circuit at several points simultaneously.

Instead of the field-circuit 3 4 being a derived circuit from the main line, it may be a circuit supplied from an external source; or a shunt-circuit from the main line may energize the field, the circuit-breaker being placed therein; or in a dynamo-machine in which the main current passes through the field such circuit-breaker may be placed in a shunt around the field for regulating the latter.

What I claim is—

1. The combination, with a dynamo or magneto electric machine and its regulating-circuit, of a continuously-vibrating circuit-controller acting to open and close said circuit rapidly for regulating the generation of current by the machine, substantially as set forth.

2. The combination, with a dynamo or magneto electric machine and its regulating-circuit, of a continuously-vibrating circuit-controller adapted to make and break said circuit at several points simultaneously for regulating the generation of current by the machine, substantially as set forth.

3. The combination, with a dynamo or magneto electric machine and its regulating-circuit, of a continuously-vibrating circuit-controller acting to open and close said circuit rapidly for regulating the generation of current, and an electro-magnet energized by said current for operating said circuit-controller, substantially as set forth.

4. The combination, with a dynamo or magneto electric machine and its regulating-circuit, of a vibrating circuit-controller for regulating the generation of current, and an electro-magnet for operating said circuit-controller, located in a multiple-arc circuit from said machine, substantially as set forth.

5. The combination of the vibrating circuit-controller located in the field-circuit of the generator, and the electro-magnet for operating the same, located in a multiple-arc circuit from said generator, substantially as set forth.

6. The combination of a dynamo or magneto electric machine, its regulating-circuit, and translating devices arranged in mutiple-arc, with a continuously-vibrating circuit-controller acting to open and close said regulating-circuit rapidly for regulating the generation of current by the machine, substantially as set forth.

7. The combination of a multiple-arc circuit including the field-magnet coils of a dynamo-electric machine, a multiple-arc circuit including the armature-coils of said machine, multiple-arc circuits containing lamps or other translating devices, all said multiple-arc circuits being derived from the same main conductors, and a continuously-vibrating circuit-controller acting to open and close a circuit rapidly for regulating the generation of current by said machine, substantially as set forth.

8. The combination, with a dynamo or magneto electric machine and its regulating-circuit, of a continuously-vibrating circuit-controller acting to open and close said circuit rapidly for regulating the machine, and a spark-arresting shunt around such circuit-controller, substantially as set forth.

9. The combination, with a dynamo or magneto electric machine and its regulating circuit, of a continuously vibrating circuit-controller acting to open and close said circuit rapidly for regulating such machine, and an adjustable retractor for regulating the make and break, substantially as set forth.

This specification signed and witnessed this 28th day of February, 1882.

THOMAS A. EDISON.

Witnesses:
H. W. SEELY,
THOMAS JOHNSTON.